(12) United States Patent
Harness et al.

(10) Patent No.: US 10,190,911 B2
(45) Date of Patent: Jan. 29, 2019

(54) TARGETING SYSTEM FOR COLOR MEASUREMENT DEVICE

(71) Applicant: X-RITE, INCORPORATED, Wood Dale, IL (US)

(72) Inventors: Weston Harness, Coopersville, MI (US); David Salyer, Ada, MI (US)

(73) Assignee: X-Rite, Inc., Grand Rapids, MI (US)

( * ) Notice: Subject to any disclaimer, the term of this patent is extended or adjusted under 35 U.S.C. 154(b) by 0 days.

(21) Appl. No.: 14/782,461

(22) PCT Filed: Apr. 16, 2015

(86) PCT No.: PCT/US2015/026146
§ 371 (c)(1),
(2) Date: Oct. 5, 2015

(87) PCT Pub. No.: WO2015/164177
PCT Pub. Date: Oct. 29, 2015

(65) Prior Publication Data
US 2017/0052066 A1  Feb. 23, 2017

Related U.S. Application Data

(60) Provisional application No. 61/984,349, filed on Apr. 25, 2014.

(51) Int. Cl.
*G01J 3/02* (2006.01)
*G01J 3/04* (2006.01)
(Continued)

(52) U.S. Cl.
CPC .......... *G01J 3/0289* (2013.01); *G01J 1/0425* (2013.01); *G01J 1/0462* (2013.01); *G01J 3/021* (2013.01);
(Continued)

(58) Field of Classification Search
CPC .......... G01J 3/0289; G01J 3/0218; G01J 3/04; G01J 1/0425; G01J 1/0462; G01J 3/021; G02B 6/42
See application file for complete search history.

(56) References Cited

U.S. PATENT DOCUMENTS 5,099,693 A * 3/1992 Payne ................ G01N 29/2418
73/632
5,716,324 A * 2/1998 Toida .................... A61B 5/0084
356/484
(Continued)

FOREIGN PATENT DOCUMENTS

| GB | 2479012 | 9/2011 | |
|---|---|---|---|
| JP | 2003161856 | 6/2003 | |
| WO | WO 2011117565 A2 * | 9/2011 | ................ G01J 3/02 |

OTHER PUBLICATIONS

International Search Report From WO Patent Application #PCT/US2015/026146 dated Jul. 20, 2015.

*Primary Examiner* — Violeta A Prieto
(74) *Attorney, Agent, or Firm* — Hahn Loeser & Parks LLP

(57) ABSTRACT

A targeting system for a spectrophotometer includes a plurality of fiber channels, including at least one measurement channel and at least one illumination channel. A slit assembly includes a translucent layer disposed adjacent the plurality of fiber channels, and reflective portion disposed adjacent the translucent layer. Each fiber channel includes a first end, the first end offset from the reflective portion of the slit assembly to allow light transfer from one fiber channel to an adjacent fiber channel. A light source is in optical communication with the at least one illumination channel. A sample plane is in optical communication with a second end of the measurement channel. The system is configured such that light is transmitted from the light source, through the at (Continued)

least one illumination channel, reflected off the slit assembly, transmitted through the measurement channel, and onto the sample plane.

16 Claims, 2 Drawing Sheets

(51) Int. Cl.
  *G01J 1/04* (2006.01)
  *G02B 6/42* (2006.01)
(52) U.S. Cl.
  CPC .............. *G01J 3/0218* (2013.01); *G01J 3/04* (2013.01); *G02B 6/42* (2013.01)

(56) References Cited

U.S. PATENT DOCUMENTS

| | | | | |
|---|---|---|---|---|
| 6,002,488 | A | * | 12/1999 | Berg .................... G01J 3/0251 356/418 |
| 6,195,477 | B1 | * | 2/2001 | Denuto ................ G02B 6/3878 362/551 |
| 6,419,405 | B1 | * | 7/2002 | Boscha .................... G02B 6/32 385/137 |
| 7,262,853 | B2 | | 8/2007 | Peterson |
| 8,139,220 | B2 | | 3/2012 | Peterson |
| 2005/0140973 | A1 | * | 6/2005 | Owen ....................... G01J 3/44 356/301 |
| 2007/0133002 | A1 | * | 6/2007 | Wax ................... G01B 9/02087 356/456 |
| 2011/0137126 | A1 | * | 6/2011 | French ............... A61B 1/00165 600/178 |

* cited by examiner

TARGETING SYSTEM FOR COLOR MEASUREMENT DEVICE

BACKGROUND

The present disclosure relates to a targeting system for a spectrophotometer.

Spectrophotometers are commonly used for measuring color samples. For example, reference is made to commonly-owned U.S. Pat. No. 7,773,221B2 (the "221 patent"), the contents of which are incorporated herein by reference for all permissible purposes. The '221 patent discloses a color measurement device for use at various stages of industrial processes. The device of the '221 patent offers enhanced insensitivity to ambient light, measurement depth variations, and/or ambient temperature variations. The device of the '221 patent may be embodied as an LED-based color measurement spectrophotometer. One issue that arises in testing samples with a spectrophotometer is the need to verify that the proper region of interest (ROI) of a sample is being measured. For example, a sample may have different portions with different colors, and a particular ROI may be desired to be measured by a user. It would be desirable for a user to have an easy way to determine the precise location of the sample to be measured.

BRIEF SUMMARY

The present disclosure provides a targeting system for a spectrophotometer. The targeting system uses a light source to illuminate a sample at the same location that the spectrometer measures the properties of the sample (the specific ROI). Light is projected onto the sample plane with the pickup optics, precisely defining the area that is measured with the instrument. Thus, a user can ensure that the spectrometer is taking measurements at the desired location on a sample.

In one aspect, a targeting system for a spectrophotometer includes a plurality of fiber channels, including at least one measurement channel and at least one illumination channel. A slit assembly includes a translucent layer disposed adjacent the plurality of fiber channels, and reflective portion disposed adjacent the translucent layer. Each fiber channel includes a first end, the first end offset from the reflective portion of the slit assembly to allow light transfer from one fiber channel to an adjacent fiber channel. A light source is in optical communication with at least one illumination channel. A sample plane is in optical communication with a second end of the measurement channel. The system is configured such that light is transmitted from the light source, through the at least one illumination channel, reflected off the slit assembly, transmitted through the measurement channel, and onto the sample plane.

In another aspect, a method of targeting a sample for a spectrophotometer, includes providing a plurality of fiber channels, including at least one measurement channel and at least one illumination channel. A slit assembly includes a translucent layer disposed adjacent the plurality of fiber channels and reflective portion disposed adjacent the translucent layer. Each fiber channel includes a first end offset from the reflective portion of the slit assembly to allow light transfer from one fiber channel to an adjacent fiber channel. A light source is in optical communication with the at least one illumination channel. A sample is in a sample plane in optical communication with a second end of the measurement channel. In a targeting step, light is transmitted from the light source, through the at least one illumination channel, reflected off the slit assembly, transmitted through the measurement channel, and onto the sample plane, such that the sample plane is illuminated in at the ROI. In a measurement step, light is transmitted from a second light source, onto the sample, and through the at least one measurement channel to a spectrophotometer, wherein the first light source illuminates the sample in a same location where measurements are taken by the spectrophotometer.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DETAILED DESCRIPTION

Figure 1:
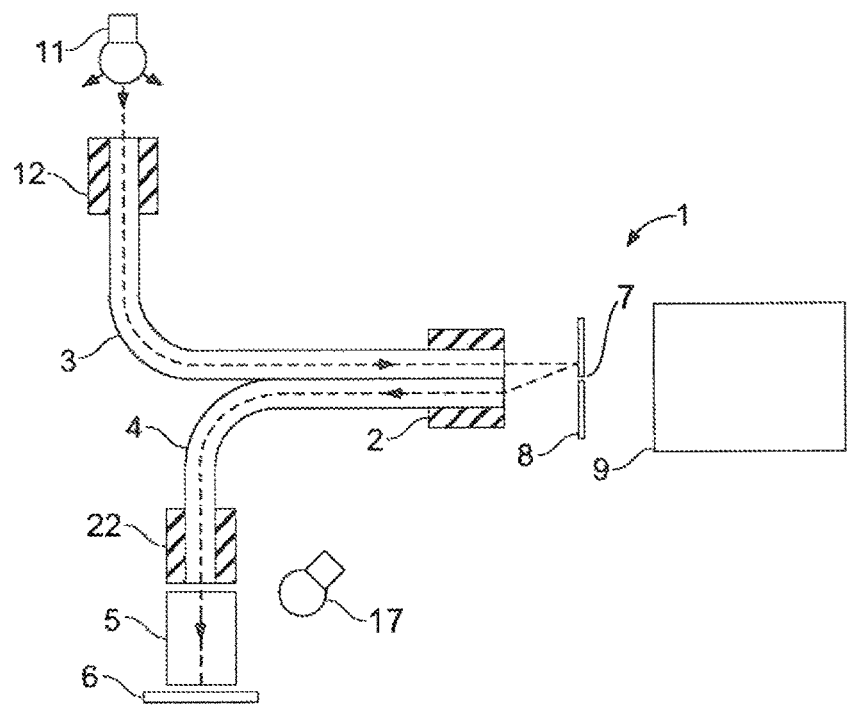
FIG. 1 is a schematic view of an embodiment of a targeting system for a spectrophotometer in a targeting mode.

The invention is described with reference to the drawings in which like elements are referred to by like numerals. The relationship and functioning of the various elements of this invention are better understood by the following detailed description. However, the embodiments of this invention as described below are by way of example only, and the invention is not limited to the embodiments illustrated in the drawings.

The present disclosure provides a targeting system for a spectrophotometer. The targeting system uses a light source to illuminate a sample at the same location that the spectrometer measures the properties of the sample. Light is projected onto the sample plane with the pickup optics, precisely defining the area that is measured with the instrument. Thus, a user can ensure that the spectrometer is taking measurements at the desired location on a sample.

Figure 2:
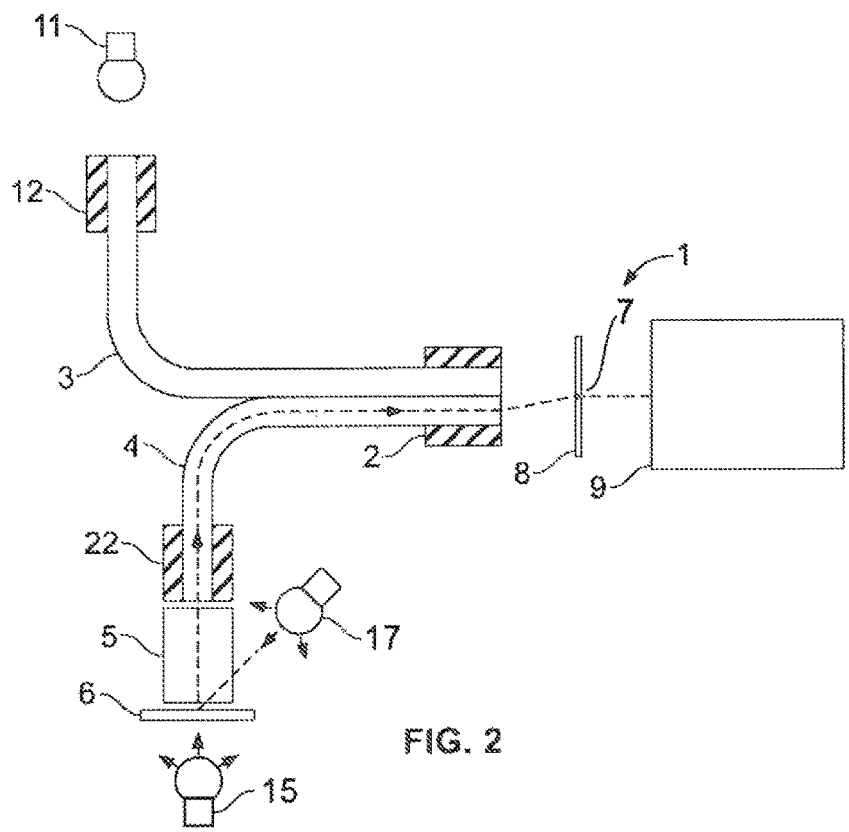
FIG. 2 is a view of an embodiment of the targeting system of FIG. 1 in a measurement mode

FIG. 1 is a schematic view of an embodiment of a targeting system 1 for a spectrophotometer 9 in a targeting mode. FIG. 2 shows the same system in a measurement mode. The system 1 includes a plurality of fiber channels 3, 4. The fiber channels may be any optical fiber suitable for conveying light. The fiber channels include at least one illumination channel 3 and at least one measurement channel 4. The illumination channel 3 extends from illumination source 11 to slit assembly 8. The measurement channel 4 extends from slit assembly 8, through ferrule 22, through measurement optics 5, to sample 6. The ferrules 12 and 22 are disposed at the ends of the respective fiber channels and serve to hold them in place.

During targeting mode, as shown in FIG. 1, light from light source 11 travels into ferrule 12 and illumination channel 3, is reflected off of mirror coating of slit assembly 8 into measurement channel 4, through ferrule 22 and measurement optics 5, and onto the surface of sample 6. Ferrule 12 supports the end of fiber channel 3. Ferrule 22 supports the end of fiber channel 4. As shown in FIG. 2, during measurement mode, light travels from light source 17, is reflected off of sample 6, travels through measurement optics 5 and ferrule 22, through measurement channel 4, through slit assembly 8, and into spectrophotometer 9. Alternatively, for a transmittance measurement, light can travel from light source 15 through sample 6 instead of being reflected. Thus, measurement channel 4 serves as an illumination channel during targeting mode and a measurement channel during measurement mode. Because of this, the same location on the sample that is illuminated during targeting mode is measured during measurement mode.

Thus, during targeting mode, light source 11 is in optical communication with the illumination channel 3. Light source 11 may be a green laser light (532 nm) from a laser diode. Of course, other light sources are possible. The sample plane 6 is in optical communication with a second end of the measurement channel 4. The system is configured such that light is transmitted from the light source 11, through the illumination channel 3, reflected off the slit assembly 8, transmitted through the measurement channel 4, and onto the sample plane 6. The spectrophotometer 9 is in optical communication with the measurement channel 4. The sample plane 6 is illuminated in the same location where measurements are taken by the spectrophotometer 9. The spot size of the sample plane preferably ranges from 2.5 mm to 20 mm, 5 mm to 15 mm, or 7 mm to 12 mm.

Figure 3:
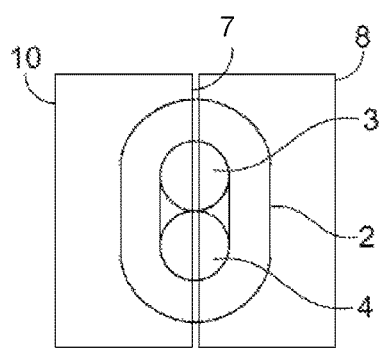
FIG. 3 is a cross sectional view of the interface between the ends of the fiber channel and the optical slit assembly.

FIG. 3 is a cross sectional view of the interface between the ends of the fiber channel and the optical slit assembly 8. The slit assembly 8 includes a mirror coating 10 and a slit 7. The slit assembly 8 processes the light entering the spectrophotometer 9. The mirror coating 10 acts to reflect light from the illumination channel 3 into the adjacent measurement channel 4.

Figure 4:
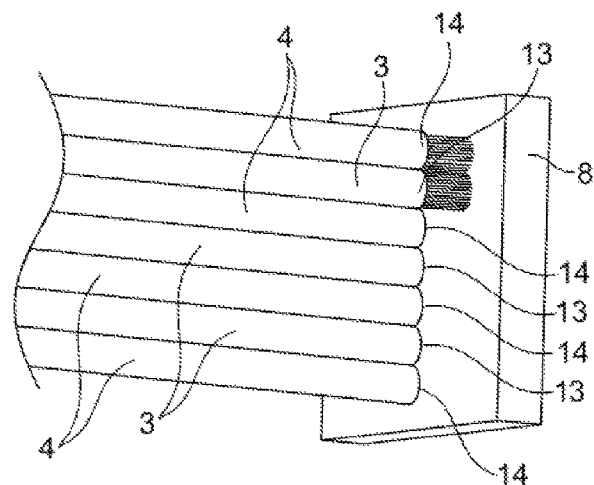
FIG. 4 is a perspective illustration of the interface between the ends of the fiber channel and the optical slit assembly.
Figure 5:
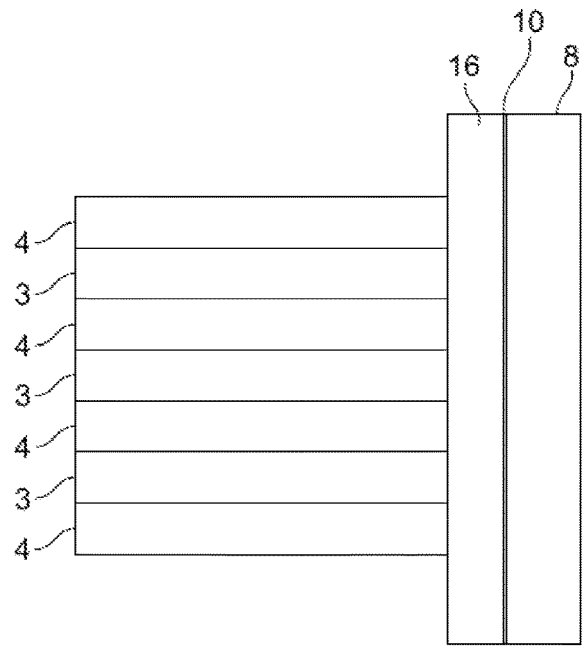
FIG. 5 is a side view of the slit assembly.

Although only one measurement and illumination channel is shown in FIGS. 1-3, in common use more than one of each channel will be present in a typical system, as can be seen in FIGS. 4 and 5. Thus, there may be two, three, four or more three measurement channels 4 and two, three, four, or more illumination channels 3. The measurement channels 4 may include at least one reference channel, a specular included channel, and a specular excluded channel. Specular included reflectance and specular excluded reflectance are terms known in the art. The specular included reflectance (also known as the "total reflectance") includes both the diffuse and specular components. The specular excluded reflectance (also known as the "diffuse reflectance") includes only the diffuse component; the specular component is completely excluded. The diameter of the optical fiber is generally between 200 um and 1 mm, preferably between 400 and 600 um, most preferably around 500 um.

Turning now to the slit assembly, FIG. 4 is a perspective illustration of the interface between the ends of the fiber channels and the optical slit assembly 8. Each fiber channel includes an end offset from the reflective portion of the slit assembly to allow light transfer from one fiber channel to an adjacent fiber channel. Illumination channel fibers 3 include ends 13 offset from mirror portion 10 of the optical slit assembly 8. Measurement channel fibers 4 include ends 14 offset from mirror portion 10 of the optical slit assembly 8.

As shown in FIG. 5, a translucent layer 16 is disposed adjacent the ends of the plurality of fiber channels, and a reflective portion 10 is disposed adjacent the translucent or clear layer 16, opposite the ends of the fiber channels. The ends of the fiber channels may either be offset from the clear layer of the slit assembly 8, or touching it, as long as the ends of the channel are offset from the reflective layer 10. A small air gap may be present between ends of the channels and the translucent layer 16 of the slit assembly 8. Another possibility is to use an index matching optical gel or cement and have the fibers essentially in contact with the translucent layer 16 of the slit assembly 8. A third option is not to have any clear layer, and simply create a gap that allows light to reflect from the reflective slit 10 and back into appropriate the measurement fiber.

The translucent layer 16 serves several purposes: 1) if it is in contact with the ends of the fibers, it ensures a consistent gap between the ends of the fibers and the reflective slit 7, and 2) the translucent layer 16 protects the reflective layer 10 from oxidation or dulling of the high reflectance coating. The displacement of the slit assembly 8 from the end of the fiber channels is preferably between 0.5 mm and 1.2 mm, preferably around 0.8 mm. During the targeting mode, light is transmitted from each illumination channel 3 to the adjacent illumination measurement channel(s) 4. The offset of the reflective portion 10 from the ends of the channels allows optical spread to enable this light transfer.

Thus, the present system provides a targeting system for a spectrophotometer that easily allows a user to select the precise location of a sample that is desired to be measured. The system uses the same optical fiber channels for both targeting and measurement, thus allowing precise sample area selection.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

What is claimed is:

1. A targeting system for a spectrophotometer for a targeting a sample plane, comprising:
　a plurality of fiber channels, comprising:
　　at least one measurement channel; and
　　at least one illumination channel;
　a slit assembly comprising:
　　a translucent layer disposed adjacent the plurality of fiber channels,
　　reflective portion disposed adjacent the translucent layer; and
　　a slit;
　wherein each fiber channel comprises a first end, the first end offset from the reflective portion of the slit assembly to allow light transfer from one fiber channel to an adjacent at least one measurement channel;
　a first light source in optical communication with a second end of the at least one illumination channel; and
　a second light source;

wherein the sample plane is in optical communication with a second end of the at least one measurement channel;

wherein during a targeting mode light is transmitted from the first light source, through the at least one illumination channel, reflected off the slit assembly, transmitted through the measurement channel, and onto the sample plane; and wherein during a measurement mode, the sample plane is illuminated by the second light source in a same location as during the targeting mode, such that light reflected off the sample plane travels through the at least one measurement channel.

2. The targeting system of claim 1, further comprising a spectrophotometer in optical communication with the first end of the at least one measurement channel through the slit of the slit assembly, wherein during the measurement mode, the light reflected off the sample plane and into the at least one measurement channel travels through the slit of the slit assembly and to the spectrophotometer.

3. The targeting system of claim 1, wherein the plurality of fiber channels comprises at least three measurement channels and at least two illumination channels.

4. The targeting system of claim 1, wherein the end of the fiber channel is displaced between 0.5 mm and 1.2 mm from the reflective portion of the slit assembly.

5. The targeting system of claim 1, wherein the at least one measurement channel comprises at least one reference channel, a specular included channel, and a specular excluded channel.

6. The targeting system of claim 1, wherein the diameter of each of the plurality of fiber channels is between 200 um and 1 mm.

7. The targeting system of claim 1, further comprising a ferrule for connecting the at least one illumination channel to the first light source.

8. The targeting system of claim 1, wherein the spot size of the sample plane ranges from 2.5 mm to 20 mm.

9. A method of targeting a sample for a spectrophotometer, comprising:
providing a plurality of fiber channels, comprising:
at least one measurement channel; and
at least one illumination channel;
providing a slit assembly comprising:
a translucent layer disposed adjacent to an end of each of the plurality of fiber channels,
reflective portion disposed adjacent the translucent layer; and
a slit;
wherein each fiber channel comprises a first end, the first end offset from the reflective portion of the slit assembly to allow light transfer from the at least one illumination channel to an adjacent at least one measurement channel;
providing a first light source in optical communication with a second end of at least one illumination channel;
providing a sample in a sample plane in optical communication with a second end of the measurement channel;
in a targeting step, transmitting light from the first light source, through the at least one illumination channel, reflecting off the slit assembly, transmitting through the measurement channel, and onto the sample plane, such that the sample plane is illuminated in a sample location; and
in a measurement step, transmitting light from a second light source, onto the sample, and through the at least one measurement channel to a spectrophotometer, wherein the first light source illuminates the sample in a same location where measurements are taken by the spectrophotometer.

10. The method of claim 9, wherein the plurality of fiber channels comprises at least three measurement channels and at least two illumination channels.

11. The method of claim 9, wherein the end of the fiber channel is displaced between 0.5 mm and 1.2 mm from the reflective portion of the slit assembly.

12. The method of claim 9, wherein the at least one measurement channel comprises at least one reference channel, a specular included channel, and a specular excluded channel.

13. The method of claim 9, wherein the diameter of the plurality of each fiber channel is between 200 um and 1 mm.

14. The method of claim 9, further comprising a ferrule for connecting the at least one illumination channel to the first light source.

15. The method of claim 9, wherein the spot size of the sample plane ranges from 2.5 mm to 20 mm.

16. The method of claim 9, further comprising measuring optical properties of the sample.

* * * * *

UNITED STATES PATENT AND TRADEMARK OFFICE
CERTIFICATE OF CORRECTION

PATENT NO. : 10,190,911 B2
APPLICATION NO. : 14/782461
DATED : January 29, 2019
INVENTOR(S) : Weston Harness et al.

Page 1 of 1

It is certified that error appears in the above-identified patent and that said Letters Patent is hereby corrected as shown below:

In the Claims

In Column 4, Line 50 (first line of Claim 1) delete "for a" and substitute therefor --for--.

In Column 4, Line 63 (14th line of Claim 1) delete "one fiber channel" and substitute therefor --the at least one illumination channel--.

In Column 6, Line 23 (last paragraph, third line of Claim 9) after spectrophotometer please add --through the slit--.

Signed and Sealed this
Nineteenth Day of March, 2019

Andrei Iancu
*Director of the United States Patent and Trademark Office*